US009478235B2

(12) United States Patent
Suzuki et al.

(10) Patent No.: US 9,478,235 B2
(45) Date of Patent: Oct. 25, 2016

(54) VOICE SIGNAL PROCESSING DEVICE AND VOICE SIGNAL PROCESSING METHOD

(71) Applicant: Panasonic Intellectual Property Management Co., Ltd., Osaka (JP)

(72) Inventors: Ryoji Suzuki, Nara (JP); Tohru Usukura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/907,243

(22) PCT Filed: Oct. 28, 2014

(86) PCT No.: PCT/JP2014/005434
§ 371 (c)(1),
(2) Date: Jan. 22, 2016

(87) PCT Pub. No.: WO2015/125191
PCT Pub. Date: Aug. 27, 2015

(65) Prior Publication Data

US 2016/0163334 A1 Jun. 9, 2016

(30) Foreign Application Priority Data

Feb. 21, 2014 (JP) ................................ 2014-031340

(51) Int. Cl.
*G10L 25/87* (2013.01)
*G10L 21/0388* (2013.01)
(Continued)

(52) U.S. Cl.
CPC ............ *G10L 25/87* (2013.01); *G10L 19/265* (2013.01); *G10L 21/034* (2013.01); *G10L 21/0388* (2013.01); *G10L 25/93* (2013.01)

(58) Field of Classification Search
CPC . G10L 21/034; G10L 21/0388; G10L 25/87; G10L 25/93
See application file for complete search history.

(56) References Cited

U.S. PATENT DOCUMENTS 6,606,388 B1 * 8/2003 Townsend .............. G10H 1/125 381/1
2003/0044024 A1 * 3/2003 Aarts .................... G10L 21/038 381/61

(Continued)

FOREIGN PATENT DOCUMENTS

JP 3462590 B 11/2003
JP 2005-501278 1/2005

(Continued)

OTHER PUBLICATIONS

International Search Report of PCT application No. PCT/JP2014/005434 dated Jan. 27, 2015.

*Primary Examiner* — Samuel G Neway
(74) *Attorney, Agent, or Firm* — McDermott Will & Emery LLP

(57) ABSTRACT

Up-sampler generates an up-sampled sound signal from the sound signal. From the up-sampled sound signal, odd-ordered high-harmonic generator generates an odd-ordered high-harmonic, and even-ordered high-harmonic generator generates an even-ordered high-harmonic. Vowel sound detector identifies whether or not the sound signal is vowel sound, and generates a first gain value and a second gain value. First gain controller amplifies or attenuates the odd-ordered high-harmonic based on the first gain value, and outputs the resultant odd-ordered high-harmonic. Second gain controller amplifies or attenuates the even-ordered high-harmonic based on the second gain value, and outputs the resultant even-ordered high-harmonic. Sound signal processing device adds the gain-adjusted odd-ordered high-harmonic and the gain-adjusted even-ordered high-harmonic to the up-sampled sound signal, and outputs the up-sampled sound signal having the high-harmonics added.

10 Claims, 9 Drawing Sheets

(51) Int. Cl.

| | |
|---|---|
| ***G10L 19/26*** | (2013.01) |
| ***G10L 21/034*** | (2013.01) |
| *G10L 25/93* | (2013.01) |

(56) References Cited

U.S. PATENT DOCUMENTS

2009/0003497 A1* 1/2009 Kino ...................... G10H 7/002 375/346
2010/0010649 A1* 1/2010 Ooue ............... G11B 20/10527 700/94
2016/0163334 A1* 6/2016 Suzuki ................ G10L 21/0388 704/209

FOREIGN PATENT DOCUMENTS

| | | |
|---|---|---|
| JP | 2008-197247 | 8/2008 |
| JP | 2009-048209 | 3/2009 |
| JP | 2010-019901 | 1/2010 |
| WO | 03/019534 | 3/2003 |

* cited by examiner

VOICE SIGNAL PROCESSING DEVICE AND VOICE SIGNAL PROCESSING METHOD

CROSS-REFERENCE TO RELATED APPLICATIONS

This application is a U.S. national stage application of the PCT International Application No. PCT/JP2014/005434 filed on Oct. 28, 2014, which claims the benefit of foreign priority of Japanese patent application 2014-031340 filed on Feb. 21, 2014, the contents all of which are incorporated herein by reference.

TECHNICAL FIELD

The present disclosure relates to a sound signal processing device and a method for processing sound signals.

BACKGROUND ART

PTL 1 discloses a method for processing sound signals. According to this method, a high-harmonic signal is generated based on at least a part of an original signal. Then, at least a part of the high-harmonic signal is coupled to the original signal.

CITATION LIST

Patent Literature

PTL 1: Japanese Translation of PCT Publication No. 2005-501278

SUMMARY

The present disclosure provides a sound signal processing device that improves quality of reproduced sound of sound signals to make the sound more natural and clearer to listen for a user, and a method for processing sound signals.

A sound signal processing device according to the present disclosure includes an up-sampler, an odd-ordered high-harmonic generator, an even-ordered high-harmonic generator, a vowel sound detector, a first gain controller, and a second gain controller. According to this sound signal processing device, the up-sampler is configured to perform up-sampling of a sampling frequency of a sound signal to generate an up-sampled sound signal. The odd-ordered high-harmonic generator is configured to generate an odd-ordered high-harmonic from the up-sampled sound signal. The even-ordered high-harmonic generator is configured to generate an even-ordered high-harmonic from the up-sampled sound signal. The vowel sound detector is configured to identify whether or not the sound signal is vowel sound, and generate a first gain value and a second gain value based on a result of the identification. The first gain controller is configured to perform gain adjustment to the odd-ordered high-harmonic by amplification or attenuation based on the first gain value, and output a gain-adjusted odd-ordered high-harmonic. The second gain controller is configured to perform gain adjustment to the even-ordered high-harmonic by amplification or attenuation based on the second gain value, and output a gain-adjusted even-ordered high-harmonic. Finally, the sound signal processing device is configured to add the gain-adjusted odd-ordered high-harmonic and the gain-adjusted even-ordered high-harmonic to the up-sampled sound signal, and output the up-sampled sound signal having the gain-adjusted odd-ordered high-harmonic added and the gain-adjusted even-ordered high-harmonic added.

A method for processing sound signals according to the present disclosure includes: performing up-sampling of a sampling frequency of a sound signal to generate an up-sampled sound signal; generating an odd-ordered high-harmonic and an even-ordered high-harmonic from the up-sampled sound signal; identifying whether or not the sound signal is vowel sound, and generating a first gain value and a second gain value based on a result of the identification; performing gain adjustment to the odd-ordered high-harmonic by amplification or attenuation based on the first gain value; performing gain adjustment to the even-ordered high-harmonic by amplification or attenuation based on the second gain value; and adding the gain-adjusted odd-ordered high-harmonic and the gain-adjusted even-ordered high-harmonic to the up-sampled sound signal, and outputting the up-sampled sound signal having the gain-adjusted odd-ordered high-harmonic added and the gain-adjusted even-ordered high-harmonic added.

DESCRIPTION OF EMBODIMENTS

Hereinafter, exemplary embodiments will be described in detail with reference to the drawings as needed. However, details more than necessary may be omitted. For example, a detailed description of an already well-known matter or a repetitive description of substantially the same configuration may be omitted. This is to prevent the following description from becoming too lengthy more than necessary, and to facilitate understanding of a person skilled in the art.

It should be noted that the appended drawings and the following description are provided in order to help a person skilled in the art to fully understand the present disclosure, and no way to intend to limit the scope of claims.

First Exemplary Embodiment

Hereinafter, a first exemplary embodiment will be described with reference to FIGS. 1 through 7.

[1-1. Configuration of Sound Signal Processing Device]

Figure 1:
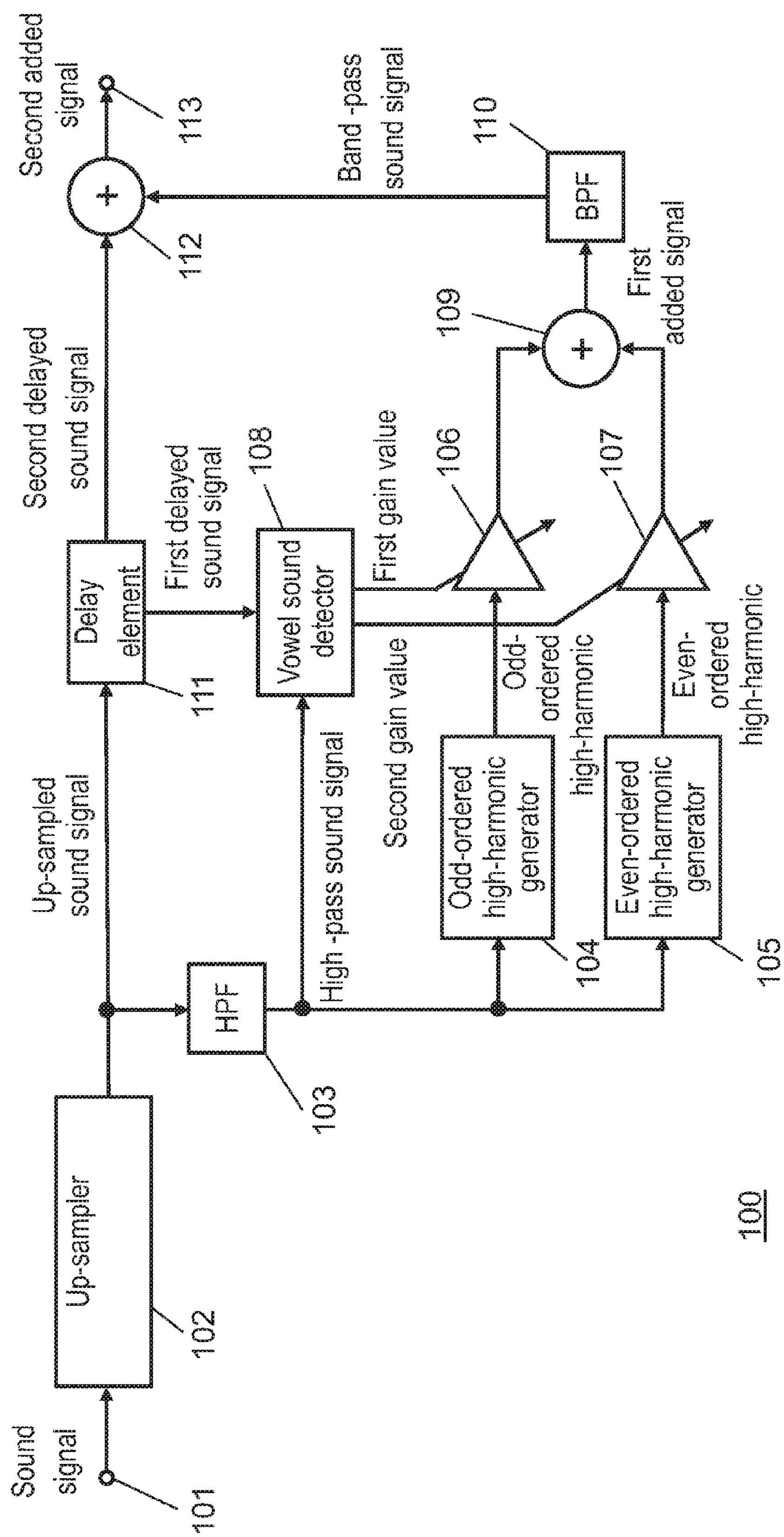
FIG. 1 is a block diagram schematically illustrating one example of a configuration of a sound signal processing device according to a first exemplary embodiment.

FIG. 1 is a block diagram schematically illustrating one example of a configuration of sound signal processing device 100 according to the first exemplary embodiment.

Sound signal processing device 101 includes input terminal 101, up-sampler 102, high-pass filter (HPF) 103 as a high-pass filter, odd-ordered high-harmonic generator 104, even-ordered high-harmonic generator 105, first gain controller 106, second gain controller 107, vowel sound detector 108, first adder 109, band-pass filter (BPF) 110 as a band-pass filter, delay element 111, second adder 112, and output terminal 113.

To input terminal 101, a sound signal is input. The sound signal input to input terminal 101 is input to up-sampler 102. The input sound signal is a digital sound signal generated by sampling an analog sound signal at a predetermined sampling frequency. The sampling frequency is 8 kHz in the case of a telephone line, and 44.1 kHz in the case of an audio Compact Disc (CD), for example. In this exemplary embodiment, an example in which a sound signal through a telephone line is processed by sound signal processing device 100 to expand a frequency band will be described. A bandwidth of the sound signal is in a range from 300 Hz to 3400 Hz, for example. However, the sound signal processed by sound signal processing device 100 is not limited to a sound signal through a telephone line.

Up-sampler 102 is configured to increase a sampling frequency of a sound signal input through input terminal 101 to generate an up-sampled sound signal, and output the generated signal to both HPF 103 and delay element 111. In the case of a telephone line, up-sampler 102 converts a sound signal sampled at 8 kHz into a sound signal sampled at 16 kHz which is twice as high as 8 kHz, and outputs the converted signal to both HPF 103 and delay element 111. With this, sound signal processing device 100 is able to increase a frequency band of the sound signal up to about twice as high as that of the input sound signal (e.g., from 300 Hz to 6800 Hz). Here, a description of a method for increasing the sampling frequency of a sound signal, up-sampling, by using up-sampler 102 will be omitted, as this method is generally known. Further, in this exemplary embodiment, while the example in which up-sampler 102 doubles the sampling frequency will be described, up-sampling is not limited to a doubled frequency.

HPF 103 is configured to attenuate a low-pass component in the up-sampled sound signal that is not necessary for odd-ordered high-harmonic generator 104 and even-ordered high-harmonic generator 105, and generate a high-pass sound signal. HPF 103 is set so that a sound signal at 1700 Hz and above may pass through HPF 103, for example. Then, HPF 103 outputs the generated high-pass sound signal to all of odd-ordered high-harmonic generator 104, even-ordered high-harmonic generator 105, and vowel sound detector 108. In other words, HPF 103 extracts a signal at a predetermined frequency (e.g., 1700 Hz) and above from the up-sampled sound signal to generate a high-pass sound signal, and outputs the generated signal to all of odd-ordered high-harmonic generator 104, even-ordered high-harmonic generator 105, and vowel sound detector 108. It should be understood that the predetermined frequency is not limited to 1700 Hz.

Odd-ordered high-harmonic generator 104 is configured to generate an odd-ordered (3 times, 5 times, 7 times, . . . ) high-harmonic from the high-pass sound signal output from HPF 103, and output the generated high-harmonic to first gain controller 106. Details of odd-ordered high-harmonic generator 104 will be described later.

Even-ordered high-harmonic generator 105 is configured to generate an even-ordered (2 times, 4 times, 6 times, . . . ) high-harmonic from the high-pass sound signal output from HPF 103, and output the generated high-harmonic to second gain controller 107. Details of even-ordered high-harmonic generator 105 will be described later.

First gain controller 106 is configured to amplify or attenuate the odd-ordered high-harmonic output from odd-ordered high-harmonic generator 104 based on a gain value (first gain value) output from vowel sound detector 108, and output the amplified or attenuated harmonic. Hereinafter, this output signal is also referred to as a "gain-adjusted odd-ordered high-harmonic".

Second gain controller 107 is configured to amplify or attenuate the even-ordered high-harmonic output from even-ordered high-harmonic generator 105 based on a gain value (second gain value) output from vowel sound detector 108, and output the amplified or attenuated harmonic. Hereinafter, this output signal is also referred to as a "gain-adjusted even-ordered high-harmonic".

Vowel sound detector 108 is configured to determine whether the sound signal is vowel sound or sound other than vowel sound, based on the high-pass sound signal output from HPF 103 and a first delayed sound signal output from delay element 111, and generate the gain values (the first gain value and the second gain value) based on the determination result. When the result of the determination is that the sound signal is sound other than vowel sound, vowel sound detector 108 generates a gain value smaller (e.g., by about half) than that generated in the case in which the result of the determination is that the sound signal is vowel sound. This is because a high-harmonic of relatively greater amplitude tends to be produced more in consonant sound than in vowel sound. Vowel sound detector 108 outputs the generated first gain value to first gain controller 106, and outputs the generated second gain value to second gain controller 107. The first gain value and the second gain value may take values that are the same or different from each other. Details of vowel sound detector 108 will be described later.

First adder 109 is configured to add the gain-adjusted odd-ordered high-harmonic output from first gain controller 106 and the gain-adjusted even-ordered high-harmonic output from second gain controller 107 to generate and output a first added signal to BPF 110.

BPF 110 is configured to extract predetermined frequency band from the first added signal output from first adder 109 to generate and output a band-pass sound signal to second adder 112. For example, BPF 110 attenuates a frequency band in the first added signal that is overlapping the sound signal input to input terminal 101, and generates the band-pass sound signal. If the frequency band of the input sound signal is not higher than 3400 Hz, for example, BPF 110 generates a band-pass sound signal in a range from 3400 Hz to 6800 Hz.

Delay element 111 is configured to generate a first delayed sound signal by delaying the up-sampled sound signal by time delay at HPF 103 so that timing of the high-pass sound signal meets timing of the first delayed sound signal at vowel sound detector 108. Further, delay element 111 is configured to generate a second delayed sound signal by delaying the up-sampled sound signal by time delay at HPF 103 or BPF 110 so that timing of the band-pass sound signal meets timing of the second delayed sound signal at second adder 112. The first delayed sound signal is output to vowel sound detector 108, and the second delayed sound signal is output to second adder 112.

Second adder 112 is configured to add the band-pass sound signal output from BPF 110 to the second delayed sound signal output from delay element 111 to generate a second added signal. With this, a sound signal with an expanded frequency band (the second added signal) as compared to the sound signal input to input terminal 101 is generated. The generated second added signal is output through output terminal 113.

[1-2. Configuration of Odd-Ordered High-Harmonic Generator]

Next, odd-ordered high-harmonic generator 104 will be described.

Figure 2:
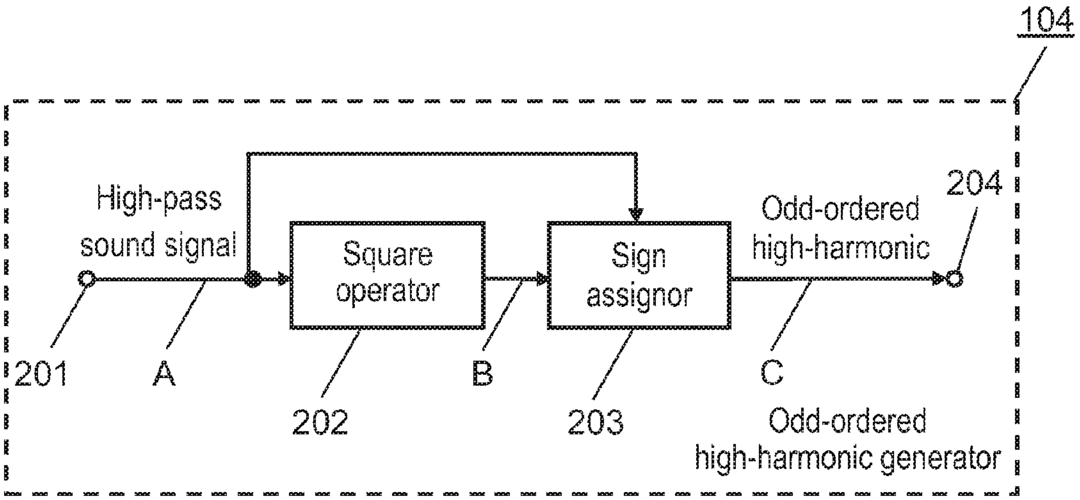
FIG. 2 is a block diagram schematically illustrating one example of a configuration of an odd-ordered high-harmonic generator according to the first exemplary embodiment.

FIG. 2 is a block diagram schematically illustrating one example of a configuration of odd-ordered high-harmonic generator 104 according to the first exemplary embodiment.

Figure 3A:
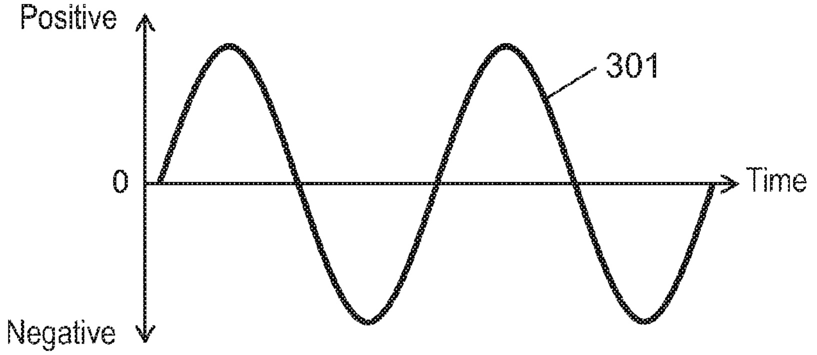
FIG. 3A is a chart schematically showing one example of an input signal waveform of the odd-ordered high-harmonic generator according to the first exemplary embodiment.
Figure 3B:
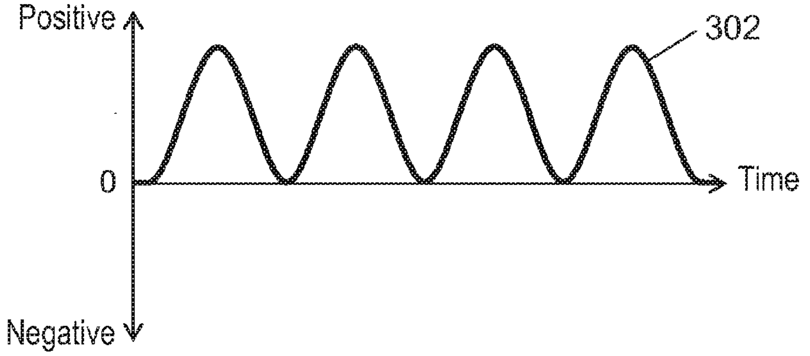
FIG. 3B is a chart schematically showing one example of a signal waveform of the odd-ordered high-harmonic generator according to the first exemplary embodiment.
Figure 3C:
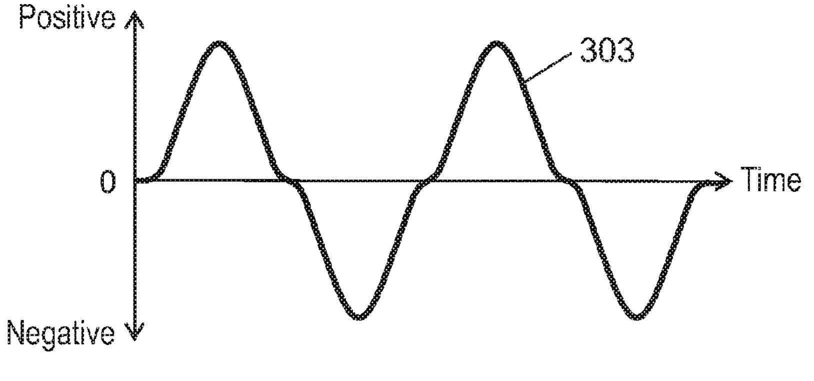
FIG. 3C is a chart schematically showing one example of an output signal waveform of the odd-ordered high-harmonic generator according to the first exemplary embodiment.

FIG. 3A is a chart schematically showing one example of an input signal waveform of odd-ordered high-harmonic generator 104 according to the first exemplary embodiment. FIG. 3B is a chart schematically showing one example of a signal waveform of odd-ordered high-harmonic generator 104 according to the first exemplary embodiment. FIG. 3C is a chart schematically showing one example of an output signal waveform of odd-ordered high-harmonic generator 104 according to the first exemplary embodiment. The waveforms shown in FIGS. 3A-3C respectively correspond to signal waveforms at points A to C in FIG. 2.

Odd-ordered high-harmonic generator 104 includes input terminal 201, square operator 202, sign assignor 203, and output terminal 204.

To input terminal 201, the high-pass sound signal output from HPF 103 is input. Here, as illustrated in FIG. 3A, an example in which sinusoidal wave 301 is input as the high-pass sound signal to input terminal 201 will be described.

Square operator 202 is configured to square the high-pass sound signal input to input terminal 201, and output the resulting signal. With this, a negative signal is converted into a positive signal. For example, when sinusoidal wave 301 shown in FIG. 3A is squared by square operator 202, sinusoidal wave 301 is converted into sinusoidal wave 302 shown in FIG. 3B and output from square operator 202.

Sign assignor 203 is configured to assign a sign of the high-pass sound signal input to input terminal 201 to the high-pass sound signal squared by square operator 202, and output the signal to which the sign is assigned through output terminal 204 as odd-ordered high-harmonic. With this, the signal converted from negative to positive by square operator 202 is returned to the original negative signal. For example, when the sign of sinusoidal wave 301 input to input terminal 201 is assigned to sinusoidal wave 302 shown in FIG. 3B, sinusoidal wave 302 is converted into sinusoidal wave 303 shown in FIG. 3C.

As can be seen from comparison between FIGS. 3A and 3C, the waveform of sinusoidal wave 303 output from odd-ordered high-harmonic generator 104 is distorted as compared to sinusoidal wave 301 input to odd-ordered high-harmonic generator 104. The distortion of sinusoidal wave 303 is attributed to the odd-ordered (first, third, fifth, . . . ) high-harmonic.

[1-3. Configuration of Even-Ordered High-Harmonic Generator]

Next, even-ordered high-harmonic generator 105 will be described.

Figure 4:
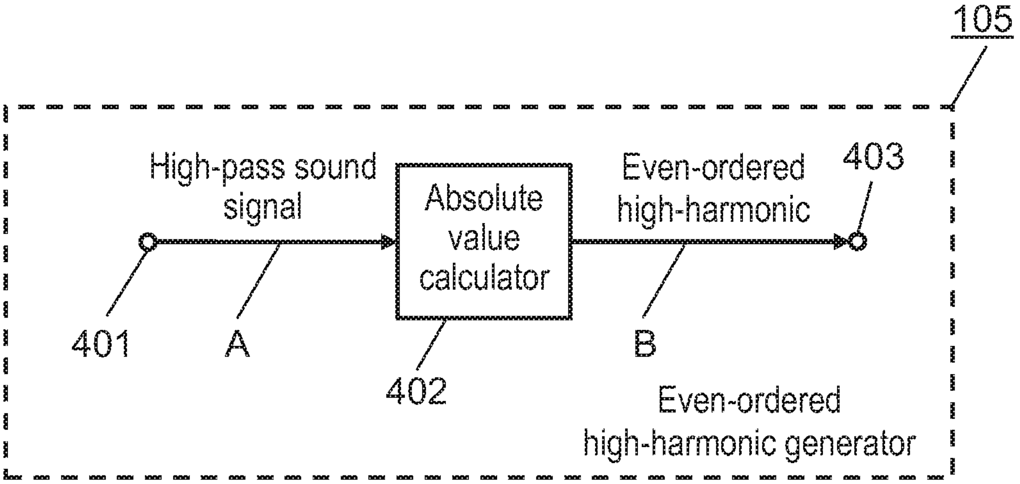
FIG. 4 is a block diagram schematically illustrating one example of a configuration of an even-ordered high-harmonic generator according to the first exemplary embodiment.

FIG. 4 is a block diagram schematically illustrating one example of a configuration of even-ordered high-harmonic generator 105 according to the first exemplary embodiment.

Figure 5A:
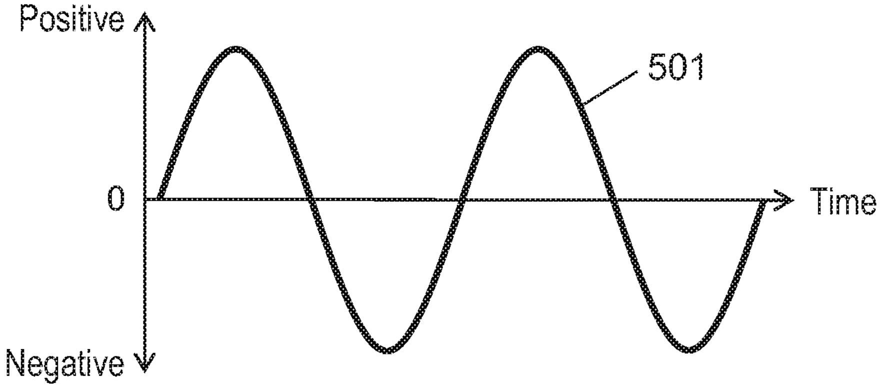
FIG. 5A is a chart schematically showing one example of an input signal waveform of the even-ordered high-harmonic generator according to the first exemplary embodiment.
Figure 5B:
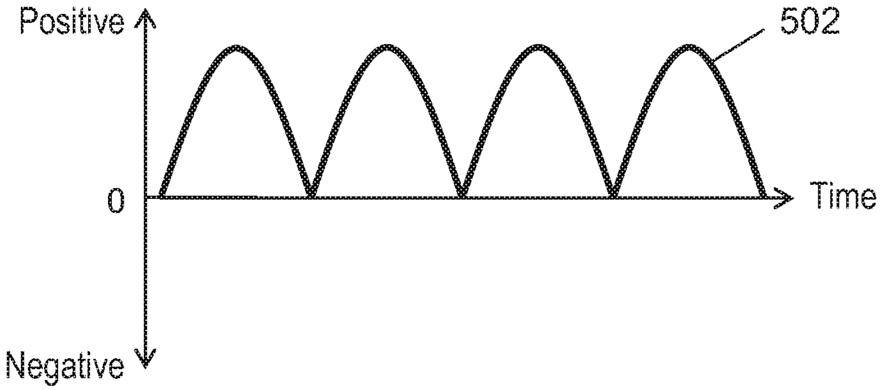
FIG. 5B is a chart schematically showing one example of an output signal waveform of the even-ordered high-harmonic generator according to the first exemplary embodiment.

FIG. 5A is a chart schematically showing one example of an input signal waveform of even-ordered high-harmonic generator 105 according to the first exemplary embodiment. FIG. 5B is a chart schematically showing one example of an output signal waveform of even-ordered high-harmonic generator 105 according to the first exemplary embodiment. The waveforms shown in FIGS. 5A and 5B respectively correspond to signal waveforms at points A and B in FIG. 4.

Even-ordered high-harmonic generator 105 includes input terminal 401, absolute value calculator 402, and output terminal 403.

To input terminal 401, the high-pass sound signal output from HPF 103 is input. Here, as illustrated in FIG. 5A, an example in which sinusoidal wave 501 is input as the high-pass sound signal to input terminal 401 will be described.

Absolute value calculator 402 is configured to calculate an absolute value of high-pass sound signal input to input terminal 401, and output a signal of the absolute value as the even-ordered high-harmonic to output terminal 403. With this, a negative signal is converted into a positive signal. For example, when sinusoidal wave 501 shown in FIG. 5A becomes an absolute value, sinusoidal wave 501 is converted into sinusoidal wave 502 shown in FIG. 5B.

As can be seen from comparison between FIGS. 5A and 5B, the waveform of sinusoidal wave 502 output from even-ordered high-harmonic generator 105 is largely distorted as compared to sinusoidal wave 501 input to even-ordered high-harmonic generator 105. The distortion of sinusoidal wave 502 is attributed to the even-ordered (zero, second, fourth, . . . ) high-harmonic.

[1-4. Configuration of Vowel Sound Detector]

Next, vowel sound detector 108 will be described.

Figure 6:
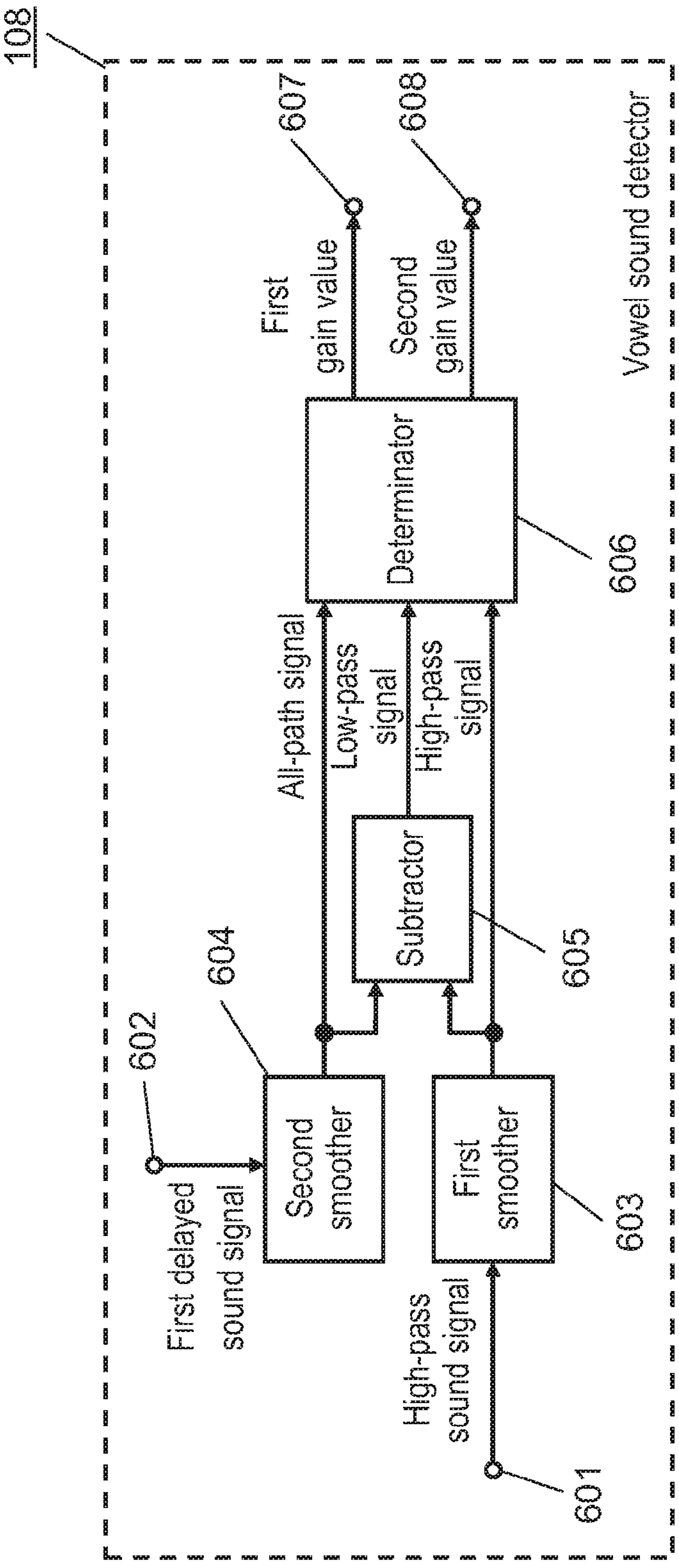
FIG. 6 is a block diagram schematically illustrating one example of a configuration of a vowel sound detector according to the first exemplary embodiment.

FIG. 6 is a block diagram schematically illustrating one example of a configuration of vowel sound detector 108 according to the first exemplary embodiment.

Vowel sound detector 108 includes input terminal 601, input terminal 602, first smoother 603, second smoother 604, subtractor 605, determinator 606, output terminal 607, and output terminal 608.

To input terminal 601, the high-pass sound signal output from HPF 103 is input.

To input terminal 602, the first delayed sound signal output from delay element 111 is input.

First smoother 603 is configured to perform integral smoothing processing to the high-pass sound signal input through first input terminal 601, and output the processed signal to subtractor 605 and determinator 606.

Second smoother 604 is configured to perform integral smoothing processing to the first delayed sound signal input through second input terminal 602, and output the processed signal to subtractor 605 and determinator 606.

Subtractor 605 is configured to generate a signal obtained by subtracting signal output from first smoother 603 (hereinafter also referred to as a "high-pass signal") from signal output from second smoother 604 (hereinafter also referred to as an "all-path signal") (hereinafter also referred to as a "low-pass signal"), and output the low-pass signal to determinator 606.

Determinator 606 is configured to determine whether the sound signal is vowel sound or sound other than vowel sound, based on the high-pass signal input from first smoother 603, the all-path signal input from second smoother 604 and the low-pass signal input from subtractor 605, and generate a gain value (a first gain value or a second gain value) based on the determination result. When the result of the determination is that the sound signal is sound other than vowel sound, determinator 606 generates a small gain value (e.g., by about half) as compared to a case in which sound signal is determined to be vowel sound. Specifically when the sound signal is determined to be sound other than vowel sound, both the first gain value and the second gain value take a value smaller than that in a case in which the sound signal is determined to be vowel sound. This is because, as described above, a high-harmonic of relatively greater amplitude tends to be produced more in consonant sound than in vowel sound. Then, determinator 606 outputs the first gain value to first gain controller 106, and outputs the second gain value to second gain controller 107.

First output terminal 607 is a terminal through which the gain value of the odd-ordered high-harmonic (first gain value) is output to first gain controller 106.

Second output terminal 608 is a terminal through which the gain value of the even-ordered high-harmonic (second gain value) is output to second gain controller 107.

[1-5. Configuration of Determinator]

Next, determinator 606 will be described.

Figure 7:
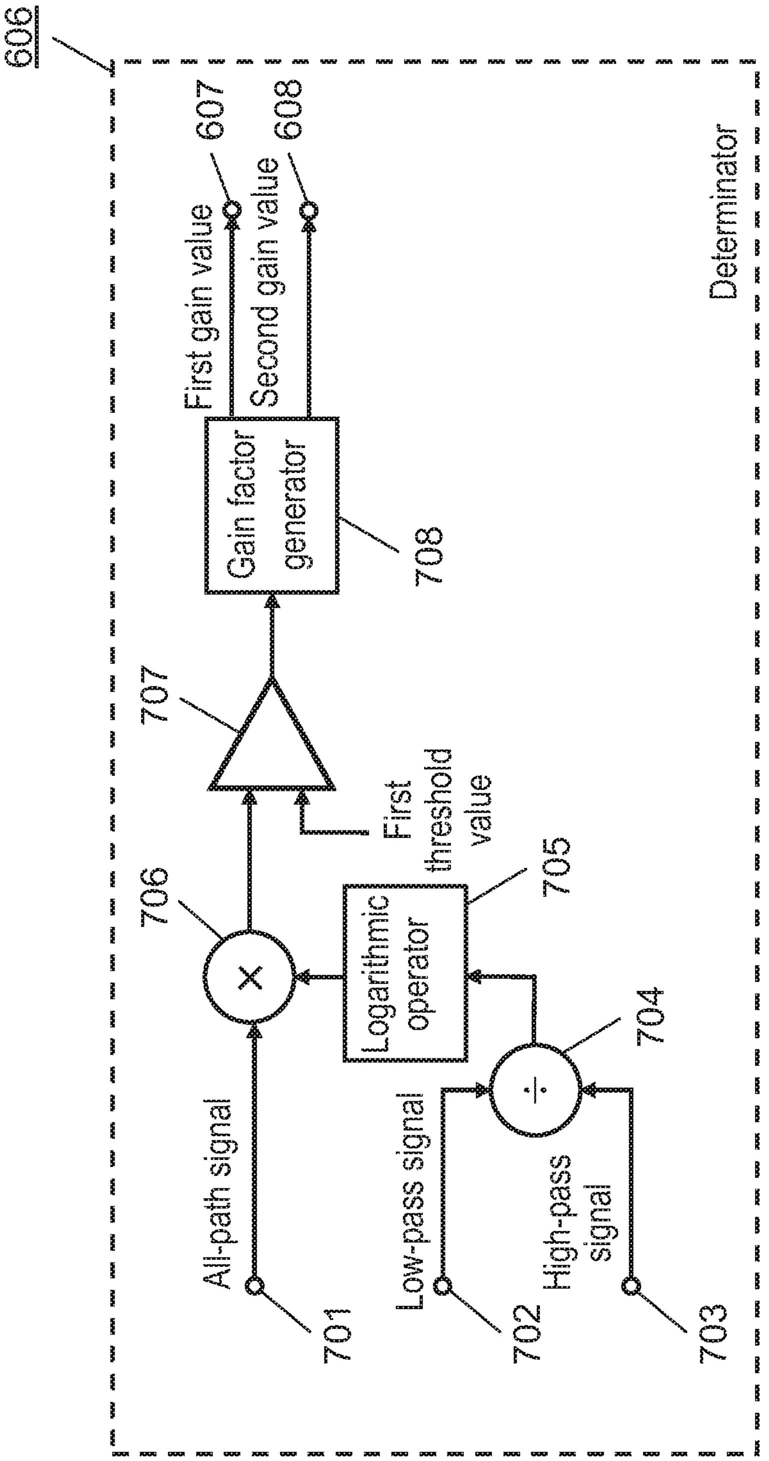
FIG. 7 is a block diagram schematically illustrating one example of a configuration of a determinator according to the first exemplary embodiment.

FIG. 7 is a block diagram schematically illustrating one example of a configuration of determinator 606 according to the first exemplary embodiment.

Determinator 606 includes input terminal 701, input terminal 702, input terminal 703, first divider 704, logarithmic operator 705, first multiplier 706, first comparator 707, and gain factor generator 708.

To input terminal 701, the all-path signal output from second smoother 604 is input.

To input terminal 702, the low-pass signal output from subtractor 605 is input.

To input terminal 703, the high-pass signal output from first smoother 603 is input.

First divider 704 is configured to divide the low-pass signal input through input terminal 702 by the high-pass signal input through input terminal 703, and output the result of the operation (amplitude of the low-pass signal/amplitude of the high-pass signal) to logarithmic operator 705. If the sound signal is vowel sound, the result of the operation is larger than that in the case in which the sound signal is sound other than vowel sound.

Logarithmic operator 705 is configured to perform logarithmic operation to the output from first divider 704, and output the result to first multiplier 706. By the logarithmic operation, it is possible to suppress magnitude of variation in the output from first divider 704.

First multiplier 706 is configured to multiply the output from logarithmic operator 705 by the all-path signal input through input terminal 701, and output the result to first comparator 707. By the multiplication, first multiplier 706 outputs a relatively large value when the sound signal is vowel sound, and first multiplier 706 outputs a relatively small value when the sound signal is sound other than vowel sound (e.g., consonant sound, silent sound, faint sound that is near silent, or the like).

First comparator 707 is configured to compare the output value from first multiplier 706 with a first threshold value, output "1" considering that the high-pass sound signal is vowel sound if the output value from first multiplier 706 is greater than the first threshold value, and output "0" considering that the high-pass sound signal is sound other than vowel sound if the output value from first multiplier 706 is not greater than the first threshold value. Here, first comparator 707 may be configured to output 1 and 0 other way round. Further, the first threshold value is assumed to be a value appropriate in order to identify vowel sound from sound other than vowel sound.

Gain factor generator 708 is configured to generate and output a first gain value and a second gain value based on the result of the determination output from first comparator 707. When the result of the determination on first comparator 707 is that the sound signal is vowel sound, gain factor generator 708 takes a gain value for vowel sound as the first gain value and the second gain value. When the result of the determination on first comparator 707 is that the sound signal is sound other than vowel sound, gain factor generator 708 takes a gain value smaller than the gain value for vowel sound (gain value for consonant sound) as the first gain value and the second gain value. The gain value for consonant sound is set to be about half of the gain value for vowel sound, for example, but the present disclosure is not limited to such setting. The gain value applied as the first gain value and the second gain value may be a gain value previously adjusted to provide favorable sound quality and recorded in gain factor generator 708. Further, the first gain value and the second gain value may take values that are the same or different from each other.

Here, a series of processing performed by sound signal processing device 100 from up-sampling the input sound signal till outputting the second added signal may be performed every unit time (e.g., sampling cycle).

[1-5. Effects and the Like]

Sound signal processing device 100 according to the first exemplary embodiment includes up-sampler 102, odd-ordered high-harmonic generator 104, even-ordered high-harmonic generator 105, vowel sound detector 108, first gain controller 106, and second gain controller 107. According to sound signal processing device 100, up-sampler 102 is configured to perform up-sampling the sampling frequency of the sound signal to generate the up-sampled sound signal. Odd-ordered high-harmonic generator 104 is configured to generate the odd-ordered high-harmonic from the up-sampled sound signal. Even-ordered high-harmonic generator 105 is configured to generate the even-ordered high-harmonic from the up-sampled sound signal. Vowel sound detector 108 is configured to identify whether or not the sound signal is vowel, and generate the first gain value and the second gain value based on the result of the identification. First gain controller 106 is configured to perform gain adjustment to the odd-ordered high-harmonic by amplification or attenuation based on the first gain value, and output the gain-adjusted odd-ordered high-harmonic. Second gain controller 107 is configured to perform gain adjustment to the even-ordered high-harmonic by amplification or attenuation based on the second gain value, and output the gain-adjusted even-ordered high-harmonic. Finally, sound signal processing device 100 is configured to add the gain-adjusted odd-ordered high-harmonic and the gain-adjusted even-ordered high-harmonic to the up-sampled sound signal, and output the up-sampled sound signal having the high-harmonics added.

Sound signal processing device 100 is configured such that the high-pass sound signal generated by letting the up-sampled sound signal pass through high-pass filter (HPF 103) is input to odd-ordered high-harmonic generator 104 and even-ordered high-harmonic generator 105.

Sound signal processing device 100 is configured such that a band-pass sound signal is generated by letting the gain-adjusted odd-ordered high-harmonic and the gain-adjusted even-ordered high-harmonic pass through hand-pass filter (BPF 110), and the band-pass sound signal and the up-sampled sound signal are added and output.

Vowel sound detector 108 is configured to make the first gain value and the second gain value smaller when the sound signal is determined to be sound other than vowel sound than those when the sound signal is vowel sound.

Further, vowel sound detector 108 includes determinator 606 configured to identify whether or not the sound signal is vowel sound, based on an all-path signal generated by smoothing the up-sampled sound signal, a high-pass signal generated by smoothing the high-pass sound signal, and a low-pass signal generated by subtracting the high-pass signal from the all-path signal.

Determinator 606 is configured to identify whether or not the sound signal is vowel sound by dividing the low-pass signal by the high-pass signal, performing logarithmic operation to the result of the division, multiplying the result of the logarithmic operation by the all-path signal, and comparing the result of the multiplication with the first threshold value.

Further, vowel sound detector 108 is configured to take 0 (zero) as the first gain value and the second gain value when the sound signal is silent or faint sound that is substantially silent.

The digital sound signal is limited to a frequency band based on the sampling frequency. Therefore, a high-pass frequency band is often lost through a telephone line or the like whose sampling frequency is relatively low, and a user may consider reproduced sound unnatural. It is confirmed that a high-pass sound signal includes a high-harmonic of a low-pass sound signal. It is also confirmed that the user tends to consider reproduced sound more natural when a high-harmonic is generated from an original signal from which a high-pass frequency is lost and the high-harmonic is added to the original signal.

Sound signal processing device 100 according to the exemplary embodiment is able to expand the frequency band of the sound signal by up-sampling the input sound signal, generate the high-harmonic from the input sound signal, and add the high-harmonic to the up-sampled sound signal. Therefore, it is possible to reproduce the sound signal as more natural sound by expanding the frequency band of the sound signal whose high-pass frequency is lost such as a sound signal through a telephone line, or the like.

However, since frequencies of voiced vowel sound and consonant sound are different from each other, a difference may be often produced between high-harmonics that are generated. Specifically a stronger high-harmonic is generated more frequently with the consonant sound than the vowel sound. Therefore, simply generating a high-harmonic to add an original signal highly possibly makes vowel sound and consonant sound in the reproduced sound unbalanced.

According to sound signal processing device 100 of this exemplary embodiment, it is possible to identify vowel sound from sound other than vowel sound such as consonant sound or the like, generate gain values different from each other based on the result of the identification, perform gain adjustment to the high-harmonic by amplification or attenuation based on the gain values, and add the gain adjusted high-harmonic to the up-sampled sound signal. Specifically, the high-harmonic may be generated by changing the gain value depending on that the sound is vowel sound or sound other than vowel sound. With this, since a frequency band of the reproduced sound of both vowel sound and consonant sound may be expanded in a balanced manner, it is possible to realize clearer and more natural reproduced sound. Further, since sound signal processing device 100 is able to amplify or attenuate the odd-ordered high-harmonic and the even-ordered high-harmonic based on the gain values different form each other, it is possible to realize clearer and more natural reproduced sound.

Specifically, sound signal processing device 100 according to this exemplary embodiment is able to improve quality of reproduced sound of sound signals to make the sound more natural and clearer to listen for the user.

Other Exemplary Embodiments

The first exemplary embodiment has thus been described as an example of the technique disclosed in the present application. However, the technique according to the present disclosure is not limited to such an example, and applicable to exemplary embodiments to which alteration, replacement, addition, omission, or the like is made. It is also possible to combine the components described in the first exemplary embodiment to provide a new exemplary embodiment.

Therefore, the following exemplifies other exemplary embodiments.

Figure 8:
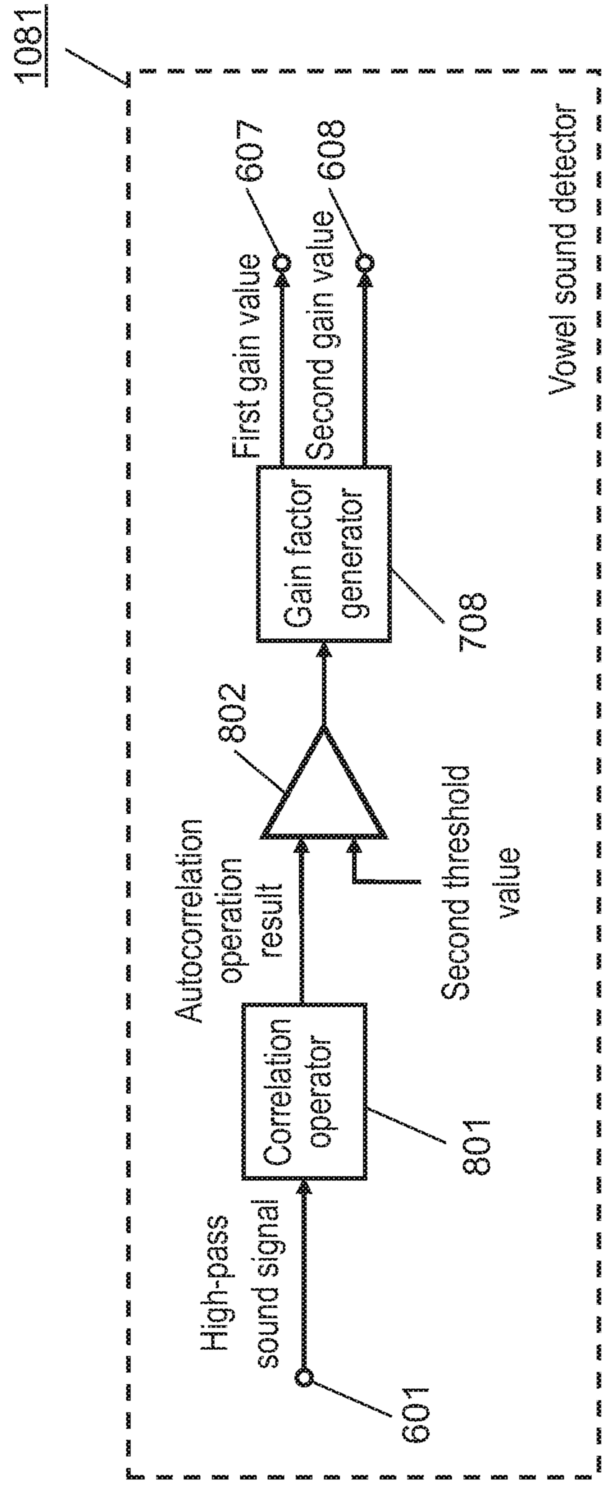
FIG. 8 is a block diagram schematically illustrating one example of a configuration of a vowel sound detector according to a different exemplary embodiment.

Vowel sound detector 108 described in the first exemplary embodiment may also be configured in a manner described below FIG. 8 is a block diagram schematically illustrating one example of a configuration of vowel sound detector 1081 according to a different exemplary embodiment.

Vowel sound detector 1081 illustrated in FIG. 8 is different from vowel sound detector 108 illustrated in the first exemplary embodiment in the following points. Vowel sound detector 1081 includes correlation operator 801, second comparator 802 and gain factor generator 708.

Correlation operator 801 is configured to perform autocorrelation operation to the high-pass sound signal input through input terminal 601, and output the result of the operation (autocorrelation operation result) to second comparator 802. Here, it is not necessary to perform the autocorrelation operation by correlation operator 801 by setting various shifting time. For example, it is possible to identify vowel sound from sound other than vowel sound by performing autocorrelation operation of a period of about 1 msec with shifting time of about 0.2 msec.

Second comparator 802 is configured to compare the result of the autocorrelation operation output from correlation operator 801 with a second threshold value, output "1" considering that the sound signal is vowel sound if the result of the autocorrelation operation is greater than the second threshold value, and output "0" considering that the sound signal is sound other than vowel sound if the result of the autocorrelation operation is not greater than the second threshold value. Here, second comparator 802 may be configured to output 1 and 0 other way round. Further, the second threshold value is assumed to be a value appropriate in order to identify vowel sound from sound other than vowel sound.

This allows reduction of an amount of operation for the vowel sound detection (reduction of the number of elements when configuring with circuits), since vowel sound detector 1081 is able to detect vowel sound with a simple configuration as compared to vowel sound detector 108 described in the first exemplary embodiment.

Vowel sound detector 108 described in the first exemplary embodiment may also be configured in a manner described below.

Figure 9:
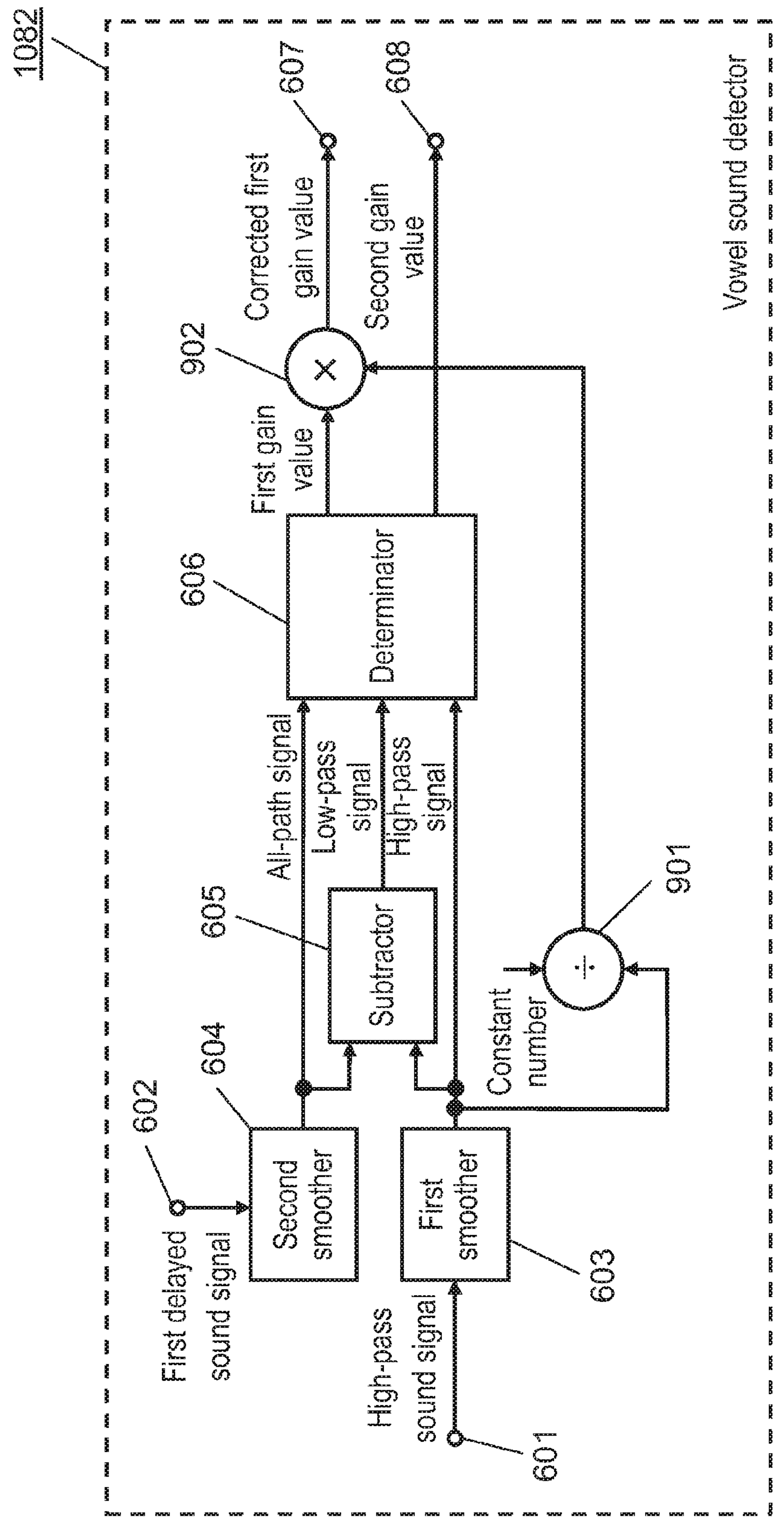
FIG. 9 is a block diagram schematically illustrating one example of a configuration of a vowel sound detector according to a different exemplary embodiment.

FIG. 9 is a block diagram schematically illustrating one example of a configuration of vowel sound detector 1082 according to a different exemplary embodiment.

Vowel sound detector 1082 illustrated in FIG. 9 is different from vowel sound detector 108 illustrated in the first exemplary embodiment in the following point. Vowel sound detector 1082 is configured such that vowel sound detector 108 described in the first exemplary embodiment further includes second divider 901 and second multiplier 902. The following describes this point of difference.

Second divider 901 is configured to perform division, taking the high-pass signal output from first smoother 603 as a divisor and a predetermined constant number as a dividend. The predetermined constant number is a value corresponding to amplitude of the high-pass signal output from first smoother 603 when a high-pass sound signal of maximum amplitude is input (specifically, maximum value of the high-pass signal). With this, second divider 901 outputs a value inversely proportional to the amplitude of the high-pass sound signal.

Second multiplier 902 is configured to multiply the first gain value by the output of second divider 901, and output the result of the multiplication as a corrected first gain value.

As square operator 202 squares the high-pass sound signal, amplitude of the odd-ordered high-harmonic takes a value proportional to a value of square of the amplitude of the high-pass sound signal. However, with second multiplier 902, it is possible to correct the first gain value to a value inversely proportional to the amplitude of the high-pass sound signal. With this, the amplitude of the gain-adjusted odd-ordered high-harmonic becomes proportional to the amplitude of the high-pass sound signal. Therefore, it is possible to prevent the amplitude of the gain-adjusted odd-ordered high-harmonic from becoming large as compared to the gain-adjusted even-ordered high-harmonic. Specifically, since the sound signal processing device employing vowel sound detector 1082 is able to balance the amplitude of the gain-adjusted odd-ordered high-harmonic and the gain-adjusted even-ordered high-harmonic, it is possible to further improve quality of reproduced sound.

In the first exemplary embodiment, a proportion of the first gain value to the second gain value that are output from vowel sound detector 108 is not particularly referred. However, each of the gain values may be set so that a proportion of the first gain value to the second gain value when the sound is vowel sound is different from a proportion of the first gain value to the second gain value when the sound is sound other than vowel sound. According to this configuration, it is possible to change sound quality of high-harmonics between the case in which the sound is vowel sound and the case in which the sound is sound other than vowel sound. With this, quality of reproduced sound may be adjusted to a user's preferred quality For example, reproduced sound using an amplifier having a vacuum tube element has a distortion characteristic that amplitude of high-harmonics of third-order and above rapidly decreases while amplitude of second-ordered high-harmonics is relatively large, and tends to be evaluated as subjectively soft sound. Further, reproduced sound using an amplifier having a transistor element has a distortion characteristic that amplitude of odd-ordered high-harmonics is greater than that of even-ordered high-harmonics, and tends to be evaluated as subjectively sharp sound. From this, sound quality control according to the user's preference such that the second gain value is made relatively large for a user who prefers soft sound, and the first gain value is made relatively large for a user who prefers sharp sound is allowed with the above configuration. Further, sound quality control such that sound quality of vowel sound is made soft and consonant sound is made sharp to balance naturalness and clarity is also allowed with the above configuration, by making the second gain value of a sound signal determined to be vowel sound relatively large, and the first gain value of a sound signal determined to be sound other than vowel sound such as consonant sound relatively large.

In the first exemplary embodiment, the example of the configuration in which vowel sound detector 108 identifies vowel sound from sound other than vowel sound is described, but the present disclosure is not limited to such a configuration.

The vowel sound detector may be configured to further identify, when the sound signal is determined to be sound other than vowel sound, whether or not the sound signal is either silent or faint sound that is near silent, and takes “0” as the first gain value and the second gain value when the sound signal is determined to be silent or faint sound. According to this configuration, it is possible to prevent a high-harmonic from being added to the sound signal determined to be silent or faint sound that is near silent, and thus to prevent deterioration of a signal to noise (SN) ratio from occurring. Moreover, it is possible to further improve quality of consonant sound after expansion of the frequency band by configuring the vowel sound detector so as to identify a voiceless consonant unaccompanied by vocal cord vibration from a voiced consonant accompanied by vocal cord vibration and to set the first gain value and the second gain value that are optimal to each of the consonants. Further, it is possible to further improve quality of consonant sound after expansion of the frequency band by configuring the vowel sound detector so as to identify the consonant sounds more finely and to set the first gain value and the second gain value that are optimal to each of the consonants.

In the first exemplary embodiment, the example in which logarithmic operator 705 performs logarithmic operation to the result of the operation of first divider 704 in determinator 606 is described, but the present disclosure is not limited to such a configuration.

The determinator may be configured by omitting logarithmic operator 705. According to this configuration, first comparator 707 is able to output substantially the same result as in the configuration having logarithmic operator 705, by appropriately changing the first threshold value. With this, it is possible to reduce an amount of operation by the determinator (reduce the number of elements when configuring with circuits).

In the example illustrated in FIG. 8, correlation operator 801 of vowel sound detector 1081 performs autocorrelation operation based on the high-pass sound signal output from HPF 103, but the present disclosure is not limited to such a configuration.

Correlation operator 801 may be configured to receive a sound signal that does not pass HPF 103, i.e., an up-sampled sound signal output from up-sampler 102, and perform autocorrelation operation based on the up-sampled sound signal. With this, correlation operator 801 is able to detect vowel sound with more low-pass components more correctly.

In the first exemplary embodiment, the example in which up-sampler 102 performs up-sampling to the input sound signal to increase the sampling frequency by twice is described, but the present disclosure is not limited to such a configuration.

Up-sampler 102 may be configured to perform up-sampling to the input sound signal to increase the sampling frequency by more than twice (e.g., sampling frequency increased by four times). With this, it is possible to add high-harmonics of higher frequencies to the original signal, and to generate a sound signal more natural.

In the first exemplary embodiment, the example of the configuration in which taking unit time as the sampling cycle, vowel sound detector 108 identifies whether the sound signal is vowel sound or sound other than vowel sound every unit time (sampling cycle) is described. However, the present disclosure is not limited to such a configuration.

The unit time may be set to be longer the sampling cycle. For example, the vowel sound detector may be configured to identify whether the sound signal is vowel sound or sound other than vowel sound every cycle that is a plurality of times of the sampling cycle. By setting the unit time appropriately, it is possible to reduce an amount of operation by the vowel sound detector (reduce the number of elements when configuring with circuits) while expanding the frequency band of the sound signal appropriately by the sound signal processing device.

In the first exemplary embodiment, the example in which the odd-ordered high-harmonic and the even-ordered high-harmonic are added to the sound signal is described, but the present disclosure is not limited to such a configuration.

For example, the sound signal processing device may be configured to include a white noise generator, and add, not only high-harmonics, but also noise (white noise) generated by the white noise generator is added to the original signal. With this configuration, it is possible to further improve an effect of an improvement of reproduced sound quality by the frequency band expansion. In particular, when the sound signal is determined to be sound other than vowel sound by vowel sound detector 108, it is possible to further improve the effect of frequency band expansion by adding noise according to the amplitude of the sound signal to the sound signal.

In the first exemplary embodiment, the configuration in which the odd-ordered high-harmonic output from odd-ordered high-harmonic generator 104 is directly input to first gain controller 106 is described, but the present disclosure is not limited to such a configuration.

It is confirmed that by generating the odd-ordered high-harmonic using the method described with reference to FIG. 2, and by generating the even-ordered high-harmonic using the method described with reference to FIG. 4, attenuation of the amplitude of the odd-ordered high-harmonic tends to become larger as the order becomes higher as compared to the even-ordered h h-harmonic. For example, there is a case in which, even if the first gain value and the second gain value are adjusted so that a second-ordered high-harmonic that is one of even-ordered high-harmonics and a third-ordered high-harmonic that is one of odd-ordered high-harmonics have the substantially the same amplitude, amplitude of a seventh-ordered high-harmonic is smaller than amplitude of a sixth-ordered high-harmonic. Therefore, it is possible to provide a high frequency region emphasizer between odd-ordered high-harmonic generator 104 and first gain controller 106, the high frequency region emphasizer being set to emphasize high frequency region of the odd-ordered high-harmonic so that its attenuation characteristic becomes substantially the same as that of the even-ordered high-harmonic. According to this configuration, it is possible to further improve the effect of frequency band expansion, as the amplitude of the odd-ordered high-harmonic and the amplitude of the even-ordered high-harmonic may be made identical for higher ordered high-harmonic.

The components that constitute the sound signal processing device according to the exemplary embodiments (the odd-ordered high-harmonic generator, the even-ordered high-harmonic generator, the vowel sound detector, and the like) may be respectively configured by independent specialized circuits. Alternatively, it is possible to provide a configuration in which a program realizing the operations by the respective components is executed by the processor. Further, this program may be obtained by downloading from a server or the like, or may be obtained by a predetermined recording medium (e.g., optical discs such as CD-ROMs or the like, magnetic discs, semiconductor memories, or the like).

It should be noted that the specific values shown in the exemplary embodiments are mere examples, and the present disclosure is not limited to these specific values. The values are preferably set to be optimal values according to specifications or the like of devices and systems.

INDUSTRIAL APPLICABILITY

The present disclosure may be applied to sound signal processing devices intended for an improvement of sound quality. Specifically, the present disclosure may be applied to handsfree devices, mobile phones, smartphones, digital voice communication devices, digital sound signal reproducing devices, and the like.

REFERENCE MARKS IN THE DRAWINGS

100: sound signal processing device
101, 201, 401, 601, 602, 701, 702, 703: input terminal
102: up-sampler
103: HPF
104: odd-ordered high-harmonic generator
105: even-ordered high-harmonic generator
106: first gain controller
107: second gain controller
108, 1081, 1082: vowel sound detector
109: first adder
110: BPF
111: delay element
112: second adder
113, 204, 403, 607, 608: output terminal
202: square operator
203: sign assignor
301, 302, 303, 501, 502: sinusoidal wave
402: absolute value calculator
603: first smoother
604: second smoother
605: subtractor
606: determinator
704: first divider
705: logarithmic operator
706: first multiplier

707: first comparator
708: gain factor generator
801: correlation operator
802: second comparator
901: second divider
902: second multiplier

The invention claimed is:

1. A sound signal processing device comprising:

an up-sampler configured to perform up-sampling of a sampling frequency of a sound signal to generate an up-sampled sound signal;

an odd-ordered high-harmonic generator configured to generate an odd-ordered high-harmonic from the up-sampled sound signal;

an even-ordered high-harmonic generator configured to generate an even-ordered high-harmonic from the up-sampled sound signal;

a vowel sound detector configured to identify whether or not the sound signal vowel sound, and generate a first gain value and a second gain value based on a result of the identification;

a first gain controller configured to perform gain adjustment to the odd-ordered high-harmonic by amplification or attenuation based on the first gain value, and output a gain-adjusted odd-ordered high-harmonic; and a second gain controller configured to perform gain adjustment to the even-ordered high-harmonic by amplification or attenuation based on the second gain value, and output a gain-adjusted even-ordered high-harmonic, the sound signal processing device being configured to add the gain-adjusted odd-ordered high-harmonic and the gain-adjusted even-ordered high-harmonic to the up-sampled sound signal, and output the up-sampled sound signal having the gain-adjusted odd-ordered high-harmonic added and the gain-adjusted even-ordered high-harmonic added.

2. The sound signal processing device according to claim wherein a high-pass sound signal, generated by letting the up-sampled sound signal pass through a high-pass filter, is input to the odd-ordered high-harmonic generator and the even-ordered high-harmonic generator.

3. The sound signal processing device according to claim 1, wherein a band-pass sound signal is generated by letting the gain-adjusted odd-ordered high-harmonic and the gain-adjusted even-ordered high-harmonic pass through a band-pass filter, and the band-pass sound signal is added to the up-sampled sound signal, and then the up-sampled sound signal having the band-pass sound signal added is output.

4. The sound signal processing device according to claim 1, wherein the vowel sound detector is configured to generate the first gain value and the second gain value smaller, when the sound signal is determined to be sound other than vowel sound, than those when the sound signal is determined to be vowel sound.

5. The sound signal processing device according to claim 1, wherein the vowel sound detector includes a determinator configured to identify whether or not the sound signal is vowel sound, based on an all-path signal generated by smoothing the up-sampled sound signal, a high-pass signal generated by smoothing the high-pass sound signal, and a low-pass signal generated by subtracting the high-pass signal from the all-path signal.

6. The sound signal processing device according to claim 5, wherein the determinator is configured to identify whether or not the sound signal is vowel sound by dividing the low-pass signal by the high-pass multiplying one of a result of the division and a result of logarithmic operation to the result of the division by the all-path signal, and comparing the result of the multiplication with a first threshold value.

7. The sound signal processing device according to claim 5, wherein the vowel sound detector is configured to correct the first gain value by dividing a predetermined constant number by the high-pass signal, and multiplying the first gain value by a result of the division.

8. The sound signal processing device according to claim 2, wherein the vowel sound detector is configured to identify whether or not the sound signal is vowel sound by performing autocorrelation operation to one of the high-pass sound signal and the up-sampled sound signal, and comparing a result of the autocorrelation operation with a second threshold value.

9. The sound signal processing device according to claim 1, wherein the vowel sound detector is configured to take 0 (zero) as the first gain value and the second gain value when the sound signal is silent or faint sound that is near silent.

10. A method hod for processing sound signals, the method comprising:

performing up-sampling of a sampling frequency of a sound signal to generate an up-sampled sound signal;

generating an odd-ordered high-harmonic and an even-ordered high-harmonic from the up-sampled sound signal;

identifying whether or not the sound signal is vowel sound, and generating a first gain value and a second gain value based on a result of the identification;

performing gain adjustment to the odd-ordered high-harmonic by amplification or attenuation based on the first gain value;

performing gain adjustment to the even-ordered high-harmonic by amplification or attenuation based on the second gain value; and adding the gain-adjusted odd-ordered high-harmonic and the gain-adjusted even-ordered high-harmonic to the up-sampled sound signal, and outputting the up-sampled sound signal having the gain-adjusted odd-ordered high-harmonic added and the gain-adjusted even-ordered high-harmonic added.

* * * * *